March 29, 1966  R. R. WRIGHT ET AL  3,242,996
LOW TORQUE SCREWDRIVER
Filed March 23, 1962  3 Sheets-Sheet 2
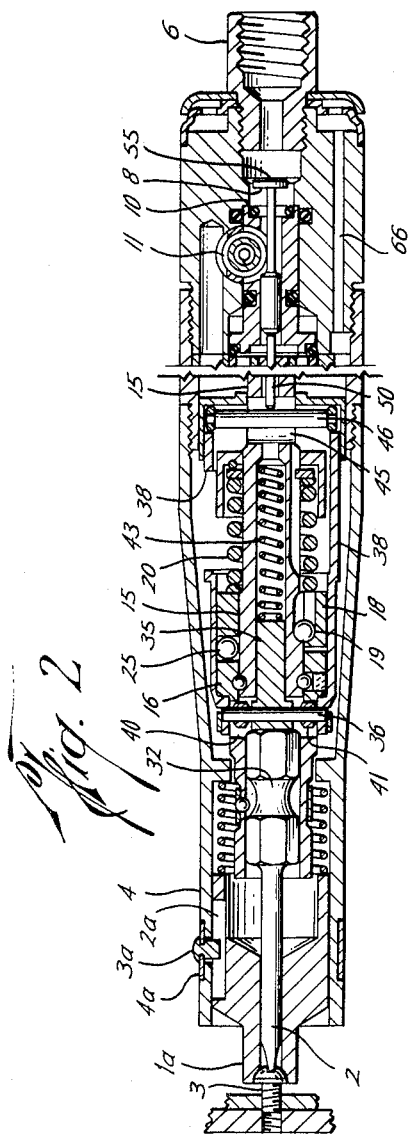
Robert R. Wright
Richard E. Eckman
INVENTORS
ATTORNEYS March 29, 1966 R. R. WRIGHT ET AL 3,242,996
LOW TORQUE SCREWDRIVER
Filed March 23, 1962 3 Sheets-Sheet 3
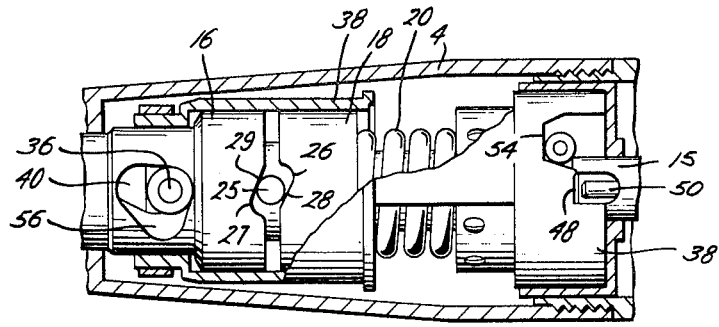
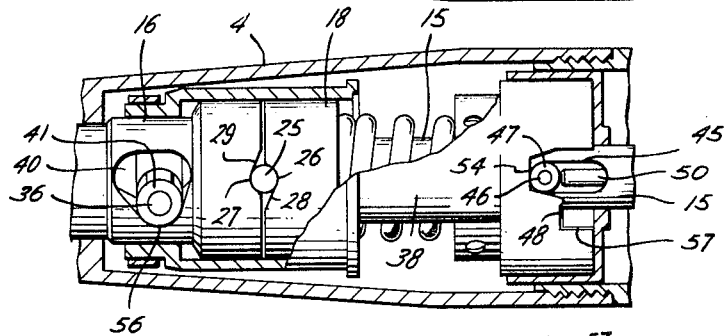
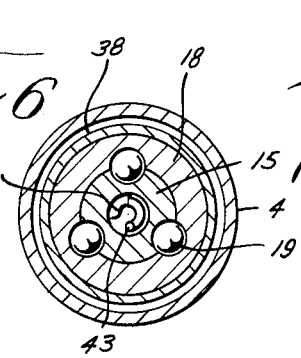
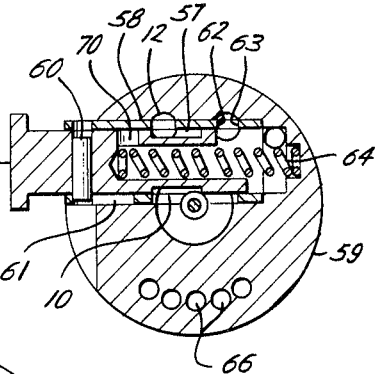
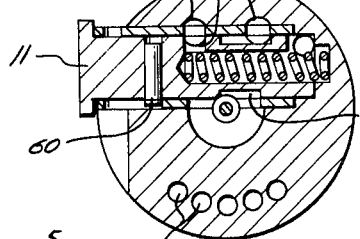
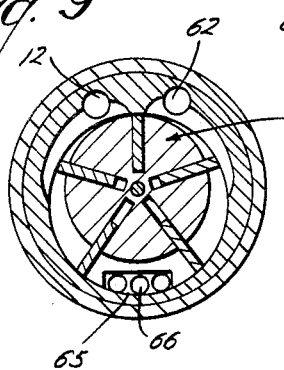
Robert R. Wright
Richard E. Eckman
INVENTORS
BY
ATTORNEYS

United States Patent Office 3,242,996
Patented Mar. 29, 1966

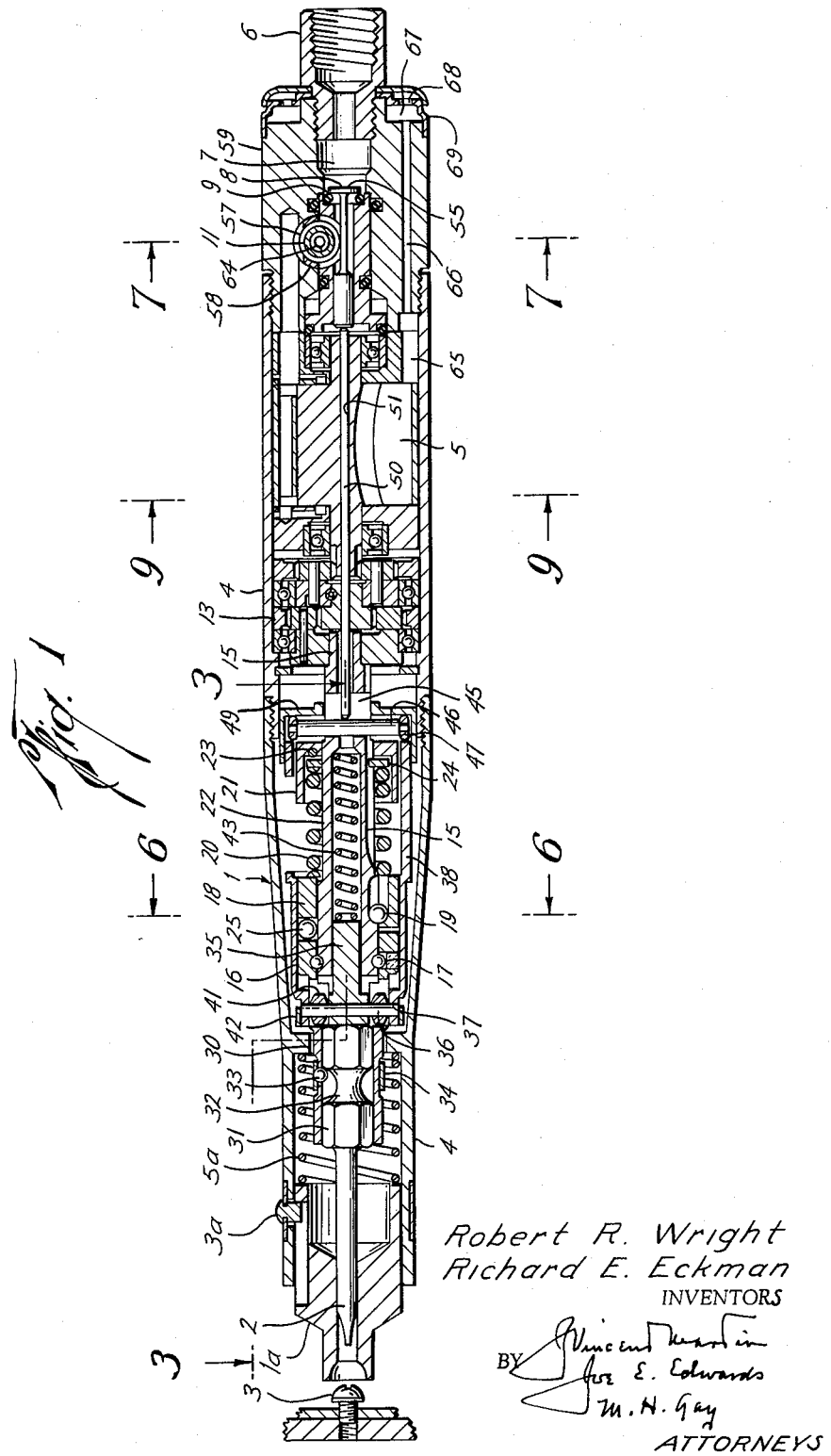

3,242,996
LOW TORQUE SCREWDRIVER
Robert R. Wright and Richard E. Eckman, Houston, Tex., assignors to Reed Roller Bit Company, Houston, Tex., a corporation of Texas
Filed Mar. 23, 1962, Ser. No. 182,035
11 Claims. (Cl. 173—93)

This invention relates generally to power driven tools such ase screwdrivers or the like and more particularly to drive mechanisms for such tools.

An object of this invention is to provide a new and improved power driven clutch mechanism, to drive fastening elements, which starts when the element engaging driver is depressed, as by contact with a screw or the like, and which automatically stops when a predetermined torque is achieved, and which mechanism automatically resets itself for a succeeding operation when the tool is disengaged from the driven fastening element.

Another object is to provide a new and improved motor driven mechanism adapted to drive screws to relatively low but accurate torque in one direction of rotation, and to deliver the full stall torque of the motor to a screw when driven in the opposite direction of rotation.

Another object is to provide a new and improved clutch for a power driven torque tool wherein the angular displacement between the clutch components is limited.

Another object is to provide a new and improved torque clutch for a power driven tool wherein each of the clutch parts automatically indexes to its original position with respect to the parts previously operatively associated therewith, to provide more consistent accuracy in torque delivered to the work, particularly when low torque requirements, such as inch-ounces, are desired for a number of similar small screws or the like.

Other objects will become apparent from the following description and accompanying drawings in which:

FIG. 1 is a longitudinal sectional view showing the arrangement of the various parts before engagement with a threaded fastening element.

FIG. 2 is a partial longitudinal sectional view showing the arrangement of the parts after the tool has been engaged with a threaded element.

FIG. 3 is a partial longitudinal sectional view of the tool showing the torque clutch, taken along lines 3—3 of FIG. 1.

FIG. 4 is a partial longitudinal sectional view similar to FIG. 3 but showing parts of the clutch mechanism with the screwdriver bit fully depressed, with the clutch in a forward torque applying position just after the motor has been shut off.

FIG. 5 is a partial longitudinal sectional view similar to that shown in FIG. 4 but with the clutch elements returned to the position shown in FIG. 3.

FIG. 6 is a sectional view taken along line 6—6 in FIG. 1.

FIG. 7 is a transverse sectional view taken along lines 7—7 in FIG. 1 showing the reversing valve set for forward operation.

FIG. 8 is a sectional view similar to FIG. 7 but showing the reversing valve set for reverse operation.

FIG. 9 is a transverse sectional view taken along lines 9—9 in FIG. 1.

Referring to FIG. 1, the tool is shown generally at 1, and in the embodiment shown, it employs a screwdriver bit 2 for driving a screw 3 or the like. It being understood that various driving bits may be used depending on the nature and shapes of the heads of the threaded elements to be driven. The tool comprises a housing 4 into which is disposed a motor 5 which may be a vane type air motor or an electric motor.

In the embodiment shown, an inlet connector 6 is attached to the rear portion of the housing 4 and is connected to a suitable air pressure source. The pressure air is admitted through the connector 6 to chamber 7 where it is confined by throttle valve 8 seated upon the valve seal 9. When the throttle valve 8 is open as shown in FIG. 2, pressure fluid is admitted to chamber 10, through the reversing valve 11, into port 12, thence to the motor 5. The motor 5 is connected to and drives the gear train assembly 13 which is rotatably connected to the drive shaft 15. The drive shaft 15 is rotatably fitted within a driven clutch element 16 which is retained axially with respect to the shaft 15 by ball bearings 17 which allow the drive shaft 15 to rotate with respect to the clutch element 16 but restrain relative axial movement therebetween.

A driving clutch element 18 is secured on the drive shaft 15 adjacent the driven clutch element 16. As shown in FIGS. 1 and 6, the driving clutch element 18 is driven by the drive shaft 15 through balls 19. The balls 19 permit relative axial movement of the driving clutch element 18 with respect to the driving shaft 15 but rotatably lock the driving clutch element 18 on the drive shaft 15.

The driving clutch element 18 is urged toward the driven clutch element 16 by a compression spring 20. The compression of the spring 20 may be varied by the axial movement of adjusting nut 21 moving over a threaded portion 22 of the drive shaft 15. A locking device comprising adjustment lock balls 23 and adjustment plate 24 is employed to retain the adjustment nut 21 in a preselected position.

Referring to FIG. 3, the driving clutch element 18 is spaced from the driven clutch element 16 by three equally spaced cam balls 25 interposed therebetween. On the front face of the driving clutch element 18 are three equally spaced cam valleys 26 registering with opposing similar valleys 27 in the rear face of the driven clutch element 16. The compression spring 20 urges the driving clutch element 18 into engagement with the driven clutch element 16 through the three cam balls 25.

Referring to FIG. 3, when the mechanism is being driven in a right hand rotation as here, the trailing edge 28 of the cam valley 26 is inclined rearwardly with respect to the rotation of the tool. The leading edge 29 of the cam valley 27 is inclined forwardly in the direction of the rotation. The compression of the spring 20 keeps the cam balls 25 in the bottom of the cam valleys 26 and 27, and enables the driving clutch element 18 to drive the driven clutch element 16 through the cam balls 25.

A forward portion 30 of the driven cam element 16 is operatively connected to the screwdriver bit 2 through the hexagon portion 31. The screwdriver bit 2 has an undercut portion 32, and is locked within the portion 30 of the driven clutch 16 by means of a ball retainer 33 and a ball retainer clip 34. Thus it will be apparent that the screwdriver bit 2 may be moved axially within the portion 30 of the driven clutch element 16.

A pilot pin 35 is positioned within the forward end of the drive shaft 15. A reset pin 36 passes through the pilot pin 35 and through holes 37 in the front end of a sleeve 38. An intermediate portion 39 of the driven clutch element 16 is provided with triangular openings 40. The reset pin 36 also passes through the triangular openings 40, and reset rollers 41 are provided on the pin 36 to operate within the triangular openings 40. The reset pin 36 is retained within the sleeve 38 by means of a retainer ring 42.

The pilot pin 35 is urged forward by reset spring 43 and urges with it the reset pin 36, the reset rollers 41, the sleeve 38 and the screwdriver bit 2, to the position shown in FIG. 1. Forward movement of the pilot pin 35 is limited by the reset rollers 41 bearing against a front end 44 of the triangular opening 40.

Referring to FIGS. 1 and 2, a finder 1a is slidably mounted within the front end of the housing 4. As the finder engages the threaded element 3, it is moved rearwardly within the housing when axial pressure is supplied by the operator to the tool to engage it with the threaded element 3. A groove 2a is formed in the finder, and a pin 3a is disposed in the groove 2a to retain the finder 1a within the housing 4. A pin retaining clip 4a secures the pin 3a to the housing 4. A spring 5a urges the finder to a forward position as shown in FIG. 1.

When the screwdriver bit 2 is pressed against the threaded element 3, as shown in FIG. 2, the hexagonal portion 31 thereof slides rearwardly within the portion 30 of the driven clutch element 16 and contacts the pilot pin 35 to move the pilot pin back within the drive shaft 15 thus compressing reset spring 43. Simultaneously the sleeve 38 moves rearwardly being driven through the reset pin 36. The slot 40 is angularly aligned with respect to the valley 27 on the driven clutch element 16. The drive shaft 15 has a slot 45 therethrough. A trip roller shaft 46 passes through the slot 45. On the outer ends of the trip roller shaft 46 are trip rollers 47 which confront the rear edges of the sleeve 38. The sleeve 38 has a shelf 48 against which the trip rollers 47 are positioned as shown in FIG. 3. The trip roller shaft 46 and the trip rollers 47 are retained in place by a retaining cap 49.

Thus as the screwdriver bit 2 is moved rearwardly against the pilot pin 35, the angular positioning of the slot 40 in the driven clutch element 16 with respect to the valleys 26 and 27 with cam balls 25 therein, aligns the sleeve 38 through the rollers 41, and the drive shaft 15 is aligned through the element 18 aligning the shaft 15 and the trip roller shaft 46 so that the trip rollers 47 are positioned on the shelf 48 of the sleeve 38.

A trip rod 50 extends through a bore 51 of the motor 5 between the trip roller shaft 46 and the valve 8. Referring to FIG. 2, it can be seen that when the sleeve 38 moves rearwardly by the action of the screwdriver bit 2 acting against pilot pin 35 which carries the pin 36 which in turn extends through the sleeve 38, as just described, the shelf 48 will register with the trip rollers 47. Since the trip roller shaft 46 confronts the forward end of the trip rod 50, the trip rod will be moved rearwardly to open the valve 8 as shown in FIG. 2, thus admitting pressure fluid to chamber 10, thence through the reversing valve 11, into port 12 and to the motor 5.

When the tool is pressed against the work as shown in FIG. 2, the rearward movement of the screwdriver bit 2, the pilot pin 35 and the sleeve 38 is limited by the rollers 41 bearing against the rear face 52 of the slot 40, as is shown in FIG. 4. The angular slope 53 of the slot 40 acts on the rollers 41 which in turn move the pin 36 and the sleeve 38 which is connected thereto, to angularly position the sleeve 38 with respect to the trip rollers 47.

The shelf 48 of the sleeve 38 cradles and receives the trip rollers 47 while the sleeve 38 is on its rearward stroke. When the threaded element 3 is set to the desired torque, the screwdriver bit 2, the driven clutch element 16, the pin rollers 41 and the pin 36, the pilot pin 35 and the sleeve 38 cease to turn, but the gear train assembly 13 powered by the motor 5 continues to turn drive shaft 15 which drives the driving clutch element 18 through the balls 19. The trip roller shaft 46 continues to rotate with the drive shaft 15 because of its close alignment in slot 45.

At this point, the valve 8 is being held open by the trip rod 50 extending between the trip roller shaft 46 and the valve 8, and the trip rollers 47 carried by the trip roller shaft 46 resting on shelf 48 of sleeve 38. The drive shaft 15 continues to rotate with respect to the sleeve 38. Simultaneously the driving clutch element 18 continues to rotate with respect to the driven clutch element 16 causing the cam balls 25 to roll up the inclined cam surfaces 28 and 29, thereby moving the driving clutch element 18 rearwardly, compressing the spring 20, as shown in FIG. 4, thus delivering the preselected torque to the screw 3 through the screwdriver bit 2. At this stage, the trip rollers 47 roll off of shelf 48 to a second shelf 54. This permits the fluid pressure acting on the head portion 55 of the valve 8 to move it forwardly to the position shown in FIG. 1 and with it move the trip rod 50 forwardly, thus shutting off the supply of pressure fluid to the tool.

When the tool is thus shut off, the motor 5 and the gear train assembly 13 cease to rotate. The spring 20 urging the driving clutch element 18 forwardly now causes the cam balls 25 to return to the cam valleys 26 and 27 as shown in FIG. 5. In the FIG. 5 position, the motor has ceased to turn although the bit 2 is still pressed upon the screwhead. The driving clutch element 18 may return to the position shown in FIG. 5 since the rollers 41 on the shaft 36 may rotate into the valley 56 of the triangular opening 40. The sleeve 38 thus may rotate in a counterclockwise direction to allow the cam balls 25 to reset in the cam valleys 26 and 27.

When the screwdriver bit 2 is removed from the threaded element 3, the reset spring 43 urges the pilot pin 35 forward carrying with it the pin 36 and the sleeve 38 to push the screwdriver bit 2 forwardly. The reset rollers 41 on pin 36 will now move forwardly and clockwise a limited distance in the triangular opening 40 to rest at the forward position 44 as shown in FIG. 3. The sleeve 38 is likewise moved forwardly and clockwise a limited distance since the reset pin 36 extends through the sleeve. Thus the parts are now returned and aligned as shown in FIGS. 1 and 3 with the reset rollers 47 now resting on the shelf 48.

A feature of this tool is that it functions, as described in the foregoing, only while driving in a right hand or clockwise direction as viewed from the rear of the tool. When the tool is driving left hand, as when removing threaded elements from a work piece, the clutch elements 16 and 18 are substantially locked together by the balls 25 being urged by the spring 20 into the valleys 26 and 27 of the clutch elements 18 and 16 respectively. As can be seen in FIG. 3, the inclined surfaces 28 and 29 are provided on the clutch elements 18 and 16 respectively only for right hand rotation. Further a side 57 of the sleeve 38 does not permit left hand angular movement of the rollers 47 with respect to the sleeve 38. Thus for reverse rotation, the valve 8 cannot move to the position shown in FIG. 1 but remains open in the position shown in FIG. 2.

For such reverse operation, the reversing valve 11 is set in the position shown in FIG. 8. The tool is again set against the work, and the valve 8 is opened, in the manner previously described, to start a reverse operation to loosen the threaded element 3. The device is now in the position shown in FIG. 3. Reverse rotation is supplied to the shaft 15, the driving element 18 and through the cam balls 25 to the driven element 16 which in turn drives the bit 2 and the threaded element 3. In this reverse direction, full motor torque to the work is desired since the screw is to be removed. In this direction, the cam balls 25 stay in the cam valleys 26 and 27, and the rollers 47 engage the shelf 48 and the walls 57 of the sleeve 38 to maintain the trip rod 50 and the valve 8 in the open position shown in FIG. 2, whereby full stall torque of the tool is available to remove the threaded element 3, irrespective of the torque setting of the clutch.

For forward operation, referring to FIGS. 1 and 7, pressure fluid is admitted into the connector 6 and into the chambers 7 and 10 around the valve 8, and circulates through the undercut 57 of the reversing valve 11. The reversing valve 11 is closely but slidably fitted in a bushing 58 which is retained in a backhead 59 by a press fit. The reversing valve 11 is retained within the bushing 58 by means of a pin 60. The end of the pin 60 extends into an elongated slot 61 within the bushing 58 to position and limit the travel of the valve 11. The bushing 58 is placed so that the port 62 in bushing 58 aligns with passageway 12 in the backhead 59, and a port 63 in the valve bushing 58 aligns with port 62 in the backhead 59. The reversing valve 11 is normally held in the position shown in FIG. 7 by a valve spring 64 and the pin 60. In this position the undercut 57 connects chamber 10 with port 62.

Fluid pressure thus admitted into the motor 5 through the passageway 12 is exhausted through ports 65 and 66 into an exhaust chamber 67 where it will be exhausted to the atmosphere through an opening 68 in an exhaust deflector plate 69.

Referring to FIG. 8, the valve 11 is set for reverse or counter-clockwise rotation as viewed from the rear of the tool. In this position, a port 70 of the reversing valve 11 now aligns with the port 12, and the undercut 57 has uncovered port 62. This allows fluid pressure passing around the valve 8 to enter port 62 to effect rotation of the tool in a counter-clockwise direction, exhausting air through the main exhaust port 65 thence through passageways 66 into the chamber 67 and out through the port 68 to the atmosphere.

As will be apparent from the foregoing, this invention provides a new and improved clutch mechanism for a power driven tool wherein the clutch parts have limited angular movement with respect to each other, and wherein each of the clutch parts automatically returns to its original position with respect to its operatively associated part. Thus the same parts always register and operate with identical associated parts, to provide more consistent accuracy in torque settings to threaded elements.

This invention is not limited to the embodiment shown. Various changes within the scope of the following claims will occur to those skilled in the art.

We claim:

1. In a power actuated tool for driving a threaded fastening element, a motor, a torque transmitting mechanism comprising a driving clutch element, a spindle driving said driving clutch element, and a driven clutch element for driving said threaded fastening element, ball cam means interposed between said driving and driven clutch elements, a spring for urging said driving clutch element toward said driven clutch element, the said driving clutch element being angularly displaced by a limited amount in one direction of rotation with respect to said driven clutch element, upon a predetermined resistance to rotation of the threaded fastening element, a threaded element driver operatively connected to said driven clutch for rotation therewith and movable axially relatively thereto, a sleeve on said driven element, means effective in response to rearward movement of said driver to admit motive power to said motor, a cam on the rear portion of said sleeve having a first and second shoulder and a leading and trailing face, a sleeve cam follower rotatable with said spindle and normally engaging said first shoulder and trailing edge of said cam, the said sleeve and sleeve cam follower being moved rearwardly by said driver upon engagement with said threaded element, the said sleeve cam follower moving from said first shoulder to said second shoulder on said cam upon said angular displacement of the said driving clutch element, means effective in response to said cam follower movement to shut off said motive power to the motor, a forward cam on said driven clutch element, a forward cam follower secured to said sleeve and engaging said forward cam, resilient means urging the said forward cam follower, driver and sleeve in a forward direction, the forward cam being effective to reposition the said sleeve cam follower on said first cam shoulder upon said forward movement of said forward cam follower, driver and sleeve, the trailing edge of the sleeve cam being effective to prevent angular displacement of the said sleeve cam follower and sleeve cam, and the ball cam means being effective to prevent angular displacement of said driving and driven clutch elements when the tool is operated in an opposite direction, to permit full motor power to be supplied to the threaded element when the tool is operated in said opposite direction.

2. In a power actuated tool for driving a threaded fastening element, a motor, a torque transmitting clutch comprising a driving clutch element, a spindle driving said driving clutch element, and a driven clutch element for driving said threaded element, ball cam means interposed between said driving and driven clutch elements, a spring engaging said driving clutch element for urging same toward said driven clutch element, the said driving clutch element being angularly displaced by a limited amount in one direction of rotation with respect to said driven clutch element, upon a predetermined resistance to rotation of the threaded fastening element, a threaded element driver operatively connected to said driven clutch for rotation therewith and movable axially relatively thereto, a sleeve carried by said driven element, means effective in response to rearward movement of said driver to admit motive power to said motor, a cam on the rear portion of said sleeve having a first and second shoulder and a leading and trailing face, a sleeve cam follower rotatable with said spindle and normally engaging said first shoulder and trailing edge of said cam, the said sleeve and sleeve cam follower being moved rearwardly by said driver upon engagement with said threaded element, the said sleeve cam follower being moved from said first shoulder to said second shoulder on said cam upon said angular displacement of the said driving clutch element, means effective in response to said cam follower movement to shut off said motive power to the motor, a forward cam on said driven clutch element, a forward cam follower secured to said sleeve and engaging said forward cam, resilient means urging the said forward cam follower, driver and sleeve in a forward direction, the forward cam being effective to reposition the said sleeve cam follower on said first shoulder upon forward movement of said forward cam follower, driver and sleeve, the said trailing edge of the sleeve cam being effective to prevent angular displacement of the said sleeve cam follower and sleeve cam when the tool is operated in an opposite direction, to permit full motor power to be supplied to the threaded element when the tool is operated in said opposite direction.

3. In a power operated tool for driving a threaded fastening element, a motor, a torque transmitting mechanism comprising a driving member connected to the motor, a driven member, a driver connected to said driven member for movement axially thereof to engage and drive said threaded element, means effective in response to movement of said driver to admit motive power to said motor, ball means operably connecting said driving and driven members and permitting limited forward angular displacement therebetween upon a predetermined resistance to rotation of said driven member, a first cam means carried by said driven member and being effective in response to said angular displacement to move from a first to a second position, means effective in response to said cam means movement to interrupt said supply of motive power, a second cam means on said driven member, resilient means urging apart said first cam means and said second cam means, the second cam means repositioning said first cam means to said first position upon forward movement of said second cam means, the said ball means being effective to prevent angular displacement between the said driving and driven members when the tool is operated in a reverse direction.

4. In a power operated tool for driving a threaded fastening element, a motor, a torque transmitting mechanism comprising a driving member conneced to a motor, the driven member, a driver connected to said driven member for movement axially thereof to engage and drive said threaded element, means effective in response to movement of said driver to admit motive power to said motor, ball means operably connecting said driving and driven members to permit limited forward angular displacement therebetween upon a predetermined resistance to rotation of said driven member, a first cam means carried by said driven member and being effective in response to said angular displacement to move from a first to a second position, means effective in response to said cam means movement to interrupt said supply of motive power, a second cam means on said driven member, resilient means urging apart said first cam means and said second cam means, the second cam means repositioning said first cam means to said first position upon forward movement of said second cam means, the first cam means when in first position being effective to prevent said interruption of motive power supply when the tool is operated in a reverse direction.

5. In a power operated tool for driving a threaded fastening element, a motor, a torque transmitting mechanism comprising a driving member connected to the motor, a driven member, a driver connected to said driven member for movement axially thereof to engage and drive said threaded element, means effective in response to movement of said driver to admit motive power to said motor, clutch means operably connecting said driving and driven members to permit limited forward angular displacement therebetween upon a predetermined resistance to rotation of said driven member, a first cam means carried by said driven member and being effective in response to said angular displacement to move from a first to a second position, means effective in response to said cam means movement to interrupt said supply of motive power, a second cam means on said driven member, resilient means urging apart said first cam means and said second cam means, the second cam means repositioning said first cam means to said first position upon forward movement of said second cam means, the first cam means when in said first position being effective to continue said supply of motive power when the tool is operated in a reverse direction.

6. A tool according to claim 5 wherein said clutch means includes ball and valley members, each of said valley members being contoured to confine therein its associated ball member during both the operative and inoperative conditions of said clutch means.

7. In a power operated tool for driving a threaded fastening element, a motor, a torque transmitting mechanism comprising a driving member connected to the motor, a driven member, a driver connected to said driven member for movement axially thereof to engage and drive said threaded element, means effective in response to movement of said driver to admit motive power to said motor, ball means operably connecting said driving and driven members permitting limited forward angular displacement therebetween upon a predetermined resistance to rotation of said driven member, a first cam means carried by said driven member and being effective in response to said angular displacement to move from a first to a second position, means effective in response to said cam means movement to interrupt said supply of motive power, a second cam means on said driven member, resilient means urging apart said first cam means and said second cam means, the second cam means repositioning said first cam means to said first position upon forward movement of said second cam means, the first cam means when in said first position and the ball means being effective to prevent angular displacement between the said driving and driven members when the tool is operated in a reverse direction.

8. In a power operated tool for driving a threaded element, a motor, means controlling a supply of motive power to said motor, means to open said control means as the tool is engaged with said threaded element, torque clutch means being angularly displaced a limited distance upon a predetermined resistance to rotation of the threaded element, a first cam means carried by said torque clutch means and moving in response to said angular displacement from a first to a second position, means effective in response to the movement of said first cam means to close said motive power control means, and a second cam means carried by said torque clutch means for repositioning said first cam means to said first position as the tool is removed from said threaded element.

9. A tool for driving a threaded element comprising a clutch means, said clutch means being angularly displaced upon a predetermined resistance to rotation of the threaded element, a first cam means carried by said clutch means and moving in response to said angular displacement from a first to a second position, and a second cam means carried by said clutch means for repositioning said first cam means to said first position as the tool is removed from said threaded element.

10. A tool according to claim 9 wherein the angular displacement of the clutch means is limited.

11. In a power operated tool for driving a threaded element, a motor, means to supply motive power to said motor, a torque transmitting device comprising a driving element and a driven element, ball cam means between said driving and driven elements, the said driving element being angularly displaced a limited distance with respect to said driven element upon a predetermined resistance to rotation of said driven element, a cam sleeve, having first and second shoulders, carried by and rotatable with said driven element, a cam sleeve follower mounted on said driving element for rotation therewith and slidable axially with respect thereto, and normally engaging with said first sleeve shoulder, said cam sleeve follower moving angularly and axially with respect to said second sleeve shoulder upon angular displacement of the said driving and driven elements, means responsive to the movement of said cam sleeve follower to shut off said supply of motive power to said motor, and cam means on said driven element for repositioning said cam sleeve follower on said first sleeve shoulder as the tool is removed from the threaded element.

References Cited by the Examiner
UNITED STATES PATENTS

| | | | |
|---|---|---|---|
| 1,855,456 | 4/1932 | Miller | 81—52.4 X |
| 2,232,545 | 2/1941 | Lum | 192—150 X |
| 2,499,708 | 3/1950 | Whitledge | 192—.084 |
| 2,580,607 | 1/1952 | Schmid | 192—.96 X |
| 2,743,635 | 5/1956 | Shaff | 81—52.4 |
| 2,790,471 | 4/1957 | Graybill | 81—52.4 |
| 2,795,857 | 6/1957 | Sedlack | 81—52.4 X |
| 2,964,151 | 12/1960 | Eckman | 173—12 X |
| 3,020,789 | 2/1962 | Etzkorn | 81—52.4 |
| 3,059,620 | 10/1962 | Eckman | 192—150 |
| 3,082,742 | 3/1963 | Vilmerding et al. | 91—59 |

BROUGHTON G. DURHAM, *Primary Examiner.*

ROBERT C. RIORDON, *Examiner.*

T. F. BEALL, L. P. KESSLER, *Assistant Examiners.*